United States Patent
Barth et al.

(10) Patent No.: US 10,277,332 B2
(45) Date of Patent: Apr. 30, 2019

(54) SYSTEM AND ASSOCIATED METHODOLOGY FOR DETECTING SAME ROOM PRESENCE USING ULTRASOUND AS AN OUT-OF-BAND CHANNEL

(71) Applicant: Cisco Technology, Inc., San Jose, CA (US)

(72) Inventors: Ragnvald Barth, Oslo (NO); Sverre Huseby, Lysaker (NO); Dan Peder Eriksen, Oslo (NO); Bjornar Snoksrud, Kysaker (NO)

(73) Assignee: Cisco Technology, Inc., San Jose, CA (US)

( * ) Notice: Subject to any disclaimer, the term of this patent is extended or adjusted under 35 U.S.C. 154(b) by 445 days.

(21) Appl. No.: 14/964,075

(22) Filed: Dec. 9, 2015

(65) Prior Publication Data

US 2016/0087730 A1    Mar. 24, 2016

Related U.S. Application Data (63) Continuation of application No. 13/785,428, filed on Mar. 5, 2013, now Pat. No. 9,241,016.

(51) Int. Cl.
*G06F 15/16* (2006.01)
*H04B 11/00* (2006.01)
(Continued)

(52) U.S. Cl.
CPC .......... *H04B 11/00* (2013.01); *H04L 63/0492* (2013.01); *H04L 63/107* (2013.01);
(Continued)

(58) Field of Classification Search
CPC ...................................................... H04B 11/00
See application file for complete search history.

(56) References Cited

U.S. PATENT DOCUMENTS

| 6,587,034 B1 | 7/2003 | Heiman et al. |
| 7,352,652 B2 | 4/2008 | Holm et al. |
| (Continued) |

FOREIGN PATENT DOCUMENTS

| EP | 1335563 | 8/2003 |
| EP | 2624616 | 8/2013 |
| WO | WO2012043305 | 4/2012 |

OTHER PUBLICATIONS

International Search Report and Written Opinion cited in PCT/US2014/019040, dated May 15, 2014.
(Continued)

*Primary Examiner* — Douglas B Blair (57) ABSTRACT

A telecommunications device includes an electronic memory to store at least a network address and a random number code, and a sound unit to transmit the network address and the random number code via ultrasonic sound waves. The telecommunications device also includes a network interface to communicate via a data network using the network address and a processor to establish a communication session with another device over the data network based upon receipt of a response from the other device via the data network, the response including at least the random number code. The telecommunications device does not establish the communication session with the other device if the random number code is missing from the response or if the random number code in the response does not match the random number code transmitted in the ultrasonic sound waves.

20 Claims, 10 Drawing Sheets

(51) Int. Cl.
    *H04L 29/06*     (2006.01)
    *H04W 12/08*     (2009.01)
    *H04W 8/26*     (2009.01)

(52) U.S. Cl.
    CPC ............ *H04L 63/18* (2013.01); *H04L 65/403* (2013.01); *H04W 8/26* (2013.01); *H04W 12/08* (2013.01)

(56) References Cited

U.S. PATENT DOCUMENTS

| | | | |
|---|---|---|---|
| 7,362,656 | B2 | 4/2008 | Holm |
| 8,340,271 | B2 | 12/2012 | Knaz |
| 8,340,272 | B2 | 12/2012 | Knaz |
| 8,447,070 | B1 | 5/2013 | Bozarth et al. |
| 8,745,400 | B2 * | 6/2014 | Elwell ................. H04L 63/123 713/176 |
| 8,804,460 | B1 | 8/2014 | Price |
| 8,861,310 | B1 | 10/2014 | Karakotsios et al. |
| 9,024,998 | B2 * | 5/2015 | Chu ....................... H04N 7/142 348/14.02 |
| 2002/0132664 | A1 | 9/2002 | Miller et al. |
| 2003/0117987 | A1 | 6/2003 | Brebner |
| 2003/0142587 | A1 | 7/2003 | Zeitzew |
| 2003/0149874 | A1 | 8/2003 | Balfanz et al. |
| 2004/0150520 | A1 | 8/2004 | Barrie |
| 2005/0215315 | A1 | 9/2005 | Miller et al. |
| 2006/0035630 | A1 | 2/2006 | Morishima et al. |
| 2006/0053276 | A1 * | 3/2006 | Lortz ..................... G06F 21/43 713/2 |
| 2006/0104625 | A1 | 5/2006 | Oya |
| 2006/0174116 | A1 | 8/2006 | Balfanz et al. |
| 2007/0112942 | A1 | 5/2007 | Moquin et al. |
| 2008/0281914 | A1 | 11/2008 | Miyata |
| 2010/0023756 | A1 * | 1/2010 | Ben-Itzhak ......... H04L 63/0823 713/156 |
| 2010/0146438 | A1 | 6/2010 | Bush et al. |
| 2010/0146499 | A1 | 6/2010 | Bush et al. |
| 2010/0318656 | A1 | 12/2010 | Ferren |
| 2011/0028160 | A1 | 2/2011 | Roeding et al. |
| 2011/0289319 | A1 | 11/2011 | Elwell et al. |
| 2012/0185696 | A1 | 7/2012 | Lortz et al. |
| 2013/0052983 | A1 | 2/2013 | Fletcher et al. |
| 2013/0052984 | A1 | 2/2013 | Mohler et al. |
| 2013/0066974 | A1 | 3/2013 | Yoakum et al. |
| 2013/0106977 | A1 | 5/2013 | Chu et al. |
| 2013/0176984 | A1 | 7/2013 | Koezuka |
| 2013/0225165 | A1 * | 8/2013 | Das ....................... H04W 48/16 455/434 |

OTHER PUBLICATIONS

Kindberg et al., Validating and Securing Spontaneous Associations between Wireless Devices, Sep. 12, 2002, Mobile and Media Systems Labratory.

Naveen Sastry et al., Secure Verification of Location Claims, Sep. 19, 2003, WiSE, San Diego, CA.

Rene Mayrhofer et al., On the Security of Ultrasound as Out-of-Band Channel, 2007, Parallel and Distributed Processing Symposium.

\* cited by examiner

SYSTEM AND ASSOCIATED METHODOLOGY FOR DETECTING SAME ROOM PRESENCE USING ULTRASOUND AS AN OUT-OF-BAND CHANNEL

This application is a continuation under 35 U.S.C § 120 and 37 C.F.R. § 1.53(b) of U.S. patent application Ser. No. 13/785,428 filed Mar. 5, 2013, the disclosure of which is incorporated herein by reference in its entirety.

The present disclosure relates generally to a system and associated method that uses ultrasonic out-of-band communication to detect the presence or absence of a device within a same room where the system is installed.

BACKGROUND

Recently, personal electronic devices such as smart phones, tablet computers, laptop computers, pocket computers and the like have gained widespread use and popularity, making them ubiquitous in the business setting. Telecommunications systems, such as audio/video conferencing systems and telepresence systems, now allow conferees and users to connect to a conference session or otherwise interact with the system using their own personal electronic device. Such connections with the telecommunication systems may be made wirelessly and often without a need for user action or configuration of his or her personal electronic device.

Access to a teleconference may also be controlled and limited to a specific set of participants. This can be done by holding the teleconference in a dedicated room in which only members of the specific set of participants are allowed to enter.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF EXAMPLE EMBODIMENTS

Overview

A network address and a random number code is transmitted from a telecommunications device to a terminal device through ultrasonic sound waves. Then a response is received at the telecommunications device from the terminal device and through a data network, where the response at least includes the random number code. A communication session between the telecommunications device and the terminal device is established over the data network when the random number code received matches the random number code transmitted.

Referring now to the drawings, wherein like reference numerals designate identical or corresponding parts throughout the several views.

Figure 1:
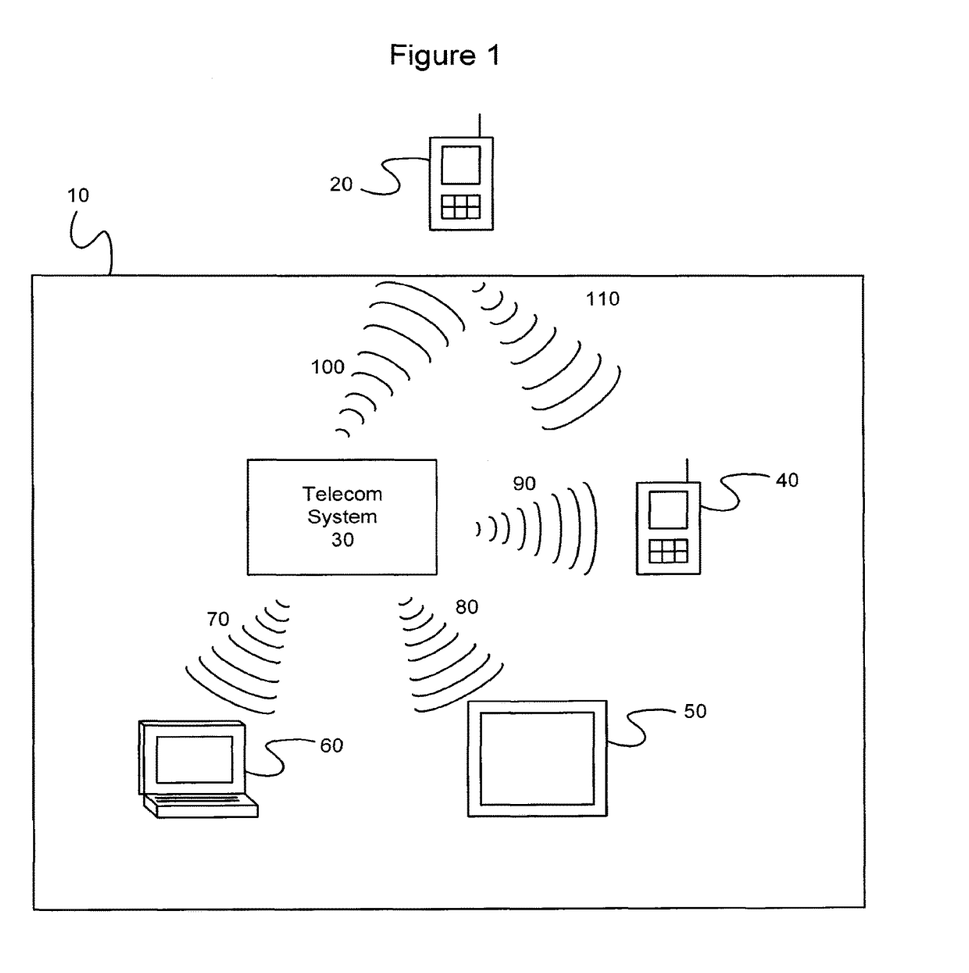
FIG. 1 illustrates an exemplary system according to aspects of the present disclosure.

FIG. 1 illustrates an exemplary system for determining presence or absence of a terminal device according to aspects of the present disclosure. In FIG. 1, a telecommunications device, or system, 30 is installed in a room 10 in which teleconferences and/or video conferences are to be held. Also in the room 10 are several personal electronic devices, or terminal devices, such as a smart phone 40, a tablet computer 50 and a laptop computer 60, which may used by conferees to interact with the telecommunications device 30 as will be described in detail below. For the sake of brevity, three devices are illustrated in the room 10 in addition to the telecommunications device 30. However, one of ordinary skill in the art will recognize that any number of devices may be in the room and may interact with the telecommunications device 30 without departing from the scope of the present disclosure.

When a teleconference (or a videoconference) is initiated, the telecommunications device 30 broadcasts its network address and a random number code using an ultrasound out-of-band signal. The smart phone 40, the tablet computer 50 and the laptop computer 60 receive the ultrasound signal via, for example, onboard microphones, and extract the network address of the telecommunications device 30 and the random number code. Then each of the smart phone 40, the tablet computer 50 and the laptop computer 60 transmits the random number code to the network address of the telecommunications system through a data network, such as a wireless network, Bluetooth, cellular network and the like. The telecommunications device 30 receives the transmissions from the smart phone 40, tablet computer 50 and laptop computer 60, and extracts the random number code therefrom. If the random number code extracted from the transmission of the smart phone 40, for example, matches the random number code broadcast by the telecommunications device 30 using the ultrasound out-of-band transmission, then the telecommunications device 30 establishes a communication session with the smart phone 40 using the data network. From that point on a user of the smart phone 40 may interact with the telecommunications device 30, and the corresponding teleconference, using the smart phone 40. The telecommunications device 30 also performs a similar check on the random number codes received from the tablet computer 50 and the laptop computer 60, and establishes communications sessions with these devices if the received random number codes correspond to the random number code transmitted on the ultrasound out-of-band channel.

In FIG. 1, the ultrasound out-of-band communications is illustrated as separate sound waves 70, 80 and 90 being directed to each of the personal electronic devices. Although it is possible to include in the telecommunications device 30 a plurality of sound emitting devices, such as speakers, oriented in different directions in order to generate directions sound waves 70, 80 and 90, such an arrangement is only exemplary. Sound waves 70, 80 and 90 may be generated by a single omni-directional speaker or by any other speaker configuration without departing from the scope of the present disclosure.

Once a communication session between the telecommunications device 30 and any of the smart phone 40, tablet computer 50 or laptop computer 60 is established, each of these personal electronic devices may be used to, for example, capture a user's image, capture a user's voice, edit shared documents, send text messages and documents to other users and control the telecommunications device 30 itself of course, these electronic devices may also perform other functions with respect to the telecommunications device 30. Thus, the functions listed are merely examples and in no way limit this disclosure.

In FIG. 1, another smart phone 20 is illustrated outside the room 10. Any sound waves 100 that correspond to the ultrasound out-of-band communication are reflected 110, or absorbed, by the walls of the room 10 and do not reach the other smart phone 20. Therefore, the other smart phone 20 does not receive the network address of the telecommunications device 30 or the random number code, and cannot connect to the telecommunications device. Even if the other smart phone 20 were to somehow determine the network address of the telecommunications device 30, because it does not have the random number code the telecommunications device 30 would not establish a communication session with the other smart phone 20 and thus only electronic devices within the room 10 are able to establish a communication session with the telecommunications device 30.

Of course, the device outside of the room 10 need not be a smart phone. Any electronic device capable of communicating via a data network, such as a wireless network, may be situated outside the room 10 and may be denied a communication session with the telecommunications device 30 as described above without departing from the scope of the present disclosure.

Figure 2:
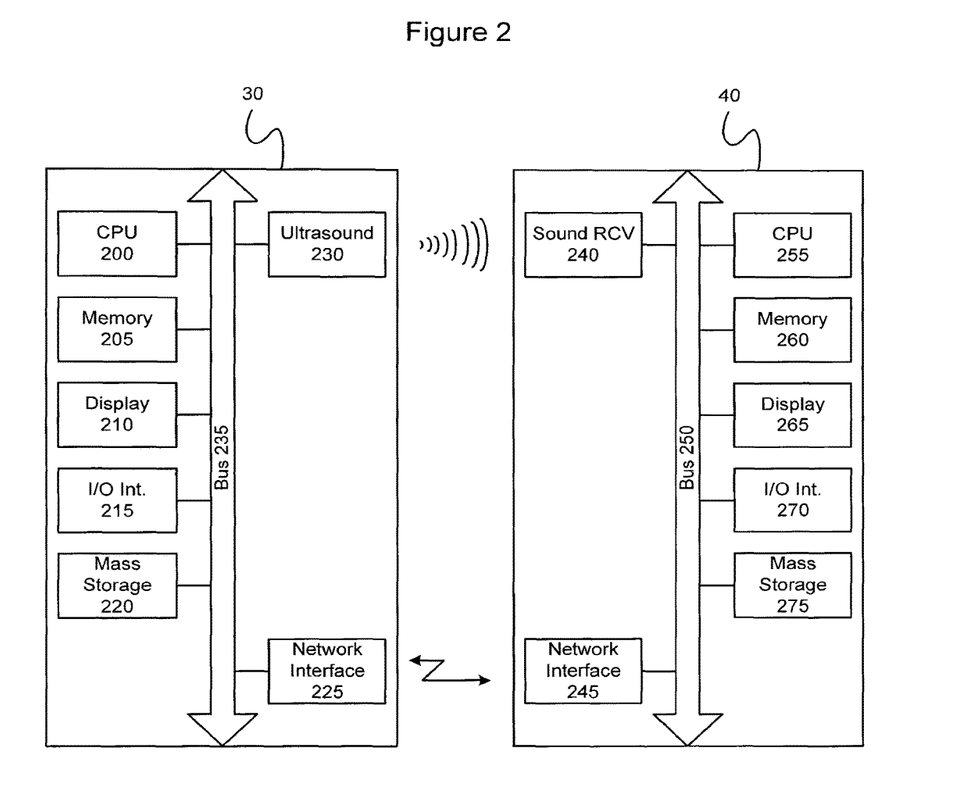
FIG. 2 illustrates exemplary hardware configurations of a telecommunication device and a terminal device according to aspects of the present disclosure.

FIG. 2 illustrates exemplary hardware configurations for both the telecommunications device 30 and a terminal device, such as the smart phone 40. The telecommunications device 30 includes a CPU 200, such as the Core i5 or i7 processors from the Intel Corporation or the FX, Phenom II, Athlon II or Sempron processors from AMD Corporation. The CPU 200 may also be a reduced instruction set processor such as an ARM Cortex A8 processor or may be implemented in discrete logic or as an application specific integrated circuit (ASIC). The CPU 200 is connected to memory 205, a display 210, an input/output (I/O) interface 215 and a mass storage device 220 via a bus 235. The CPU is also connected to an ultrasound module 230 and a network interface 225 via the bus 235. The CPU may run an operating system, such as Windows 7, Android, IOS or MAC OSX, Linux or may execute a customized program, for example.

The memory 205 is used by the CPU 200 to store data and settings related to the processes executed thereby. Program instructions to cause the CPU 200 to perform methods as described herein may also be stored in the memory 205. In composition, the memory 205 may, for example, include static or dynamic random access memory (RAM), read only memory (ROM) or a mixture thereof. The memory 205 may also include non-volatile memory such as Erasable Programmable Read Only Memory (EPROM) or Electrically Erasable Programmable Read Only Memory (EEPROM), and may also include flash memory. At least a portion of the memory 205 may also be removable or expandable.

The display 210 of the telecommunications device 30 may be used to display images of remote conferees, and as such may include multiple display monitors. The display 210 may also display images of shared documents or information for controlling the telecommunications device 30. The display may also be integrated into the telecommunications device 30 or may be a separate, stand-alone unit to which the telecommunications device 30 is connected. In the latter case, the display 210 may be a television monitor such as a plasma flat panel monitor, a liquid crystal display (LCD) monitor or a cathode ray tube (CRT) monitor, for example. A combination of these types of monitors may also be used when the display 210 includes multiple monitors. Of course, in the event that external monitors are used, the display 210 may be implemented as a video interface including one or more video processor and associated video memory. As such video interfaces are known, the details thereof are omitted for brevity.

The telecommunications device 30 also includes an input/output (I/O) interface 215 for communicating with external peripherals, such as a keyboard, mouse, track ball, printer, scanner and the like. As such, the I/O interface 215 may include a Universal Serial Bus (USB) interface, firewire interface, parallel port, Ethernet or any other I/O interface known in the art. The I/O interface may also be wireless, such as Bluetooth.

A mass storage device 220 may store data, programming instructions, documents and the like needed in order to conduct a teleconference or a video conference. As such, the mass storage device may be an optical drive, hard disc drive, tape drive, a solid state drive or any combination of these devices. The mass storage device may also be removable.

In order to communicate with remote parties and with any terminal device present in room 10, the telecommunications device 30 also includes a network interface 225. The network interface 225 may include an Ethernet interface, an integrated digital services network (ISDN) interface, a T1 or fractional T1 line, an asymmetric digital subscriber loop (ADSL), a broad band connection or any combination thereof. The network interface 225 may also include wireless network interfaces for, for example, Wi-Fi, Wi-Max, cellular, Bluetooth, satellite or any other wireless network known in the art, or a combination thereof. As such the particular network or networks to which the network interface 225 connects does not affect the scope of the present disclosure.

The ultrasound module 230 of the telecommunication device 30 broadcasts the network address and the random number code of the telecommunications device 30 using ultrasonic sound waves. As such the ultrasound module 230 may include a dedicated speaker and associated hardware, or may be implemented by the speakers used in the telecommunications device 30 to provide the teleconference audio, for example. Although ultrasonic communication is described herein as being one-way (i.e., from the telecommunications 30 module to the terminal devices), one of ordinary skill in the art would recognize that two-way ultrasonic communication is also possible.

As can be appreciated, the components of the telecommunications described above may be integrated into a single telecommunications device 30 or may be separate devices interconnected through a network, such as Ethernet. Further, the telecommunications device 30 may be a computing device, such as a laptop computer, a desktop computer or a server computer, running software to perform the functions described herein. The functions of the telecommunications device 30 may also be distributed among several servers and/or computers that are interconnected by a network. As such, the descriptions of the telecommunications device 30 described herein are merely exemplary and do not limit the scope of the present disclosure.

FIG. 2 also illustrates an exemplary hardware configuration of a terminal device, such as smart phone 40. Although the following description is based on the smart phone 40 itself, one of ordinary skill would recognize that similar hardware configurations correspond to the other devices, such as the laptop computer 60 and the tablet computer 50. Further, only the hardware components that relate to the present disclosure are described. As can be appreciated, however, the smart phone 40, laptop computer 60 and tablet computer 50 may include additional components without departing from the scope of the present disclosure.

In FIG. 2, the smart phone 40 includes a CPU 255 connected to memory 260, display 265, input/output (I/O) interface 270 and mass storage 275 via bus 250. The CPU may be any of the processors described above with respect to the telecommunications device 30 or may be implemented as an ASIC, microcontroller, or as a combination thereof. Likewise, memory 260 may be any combination of RAM, ROM, EPROM, EEPROM and FLASH, and at least a portion thereof may be removable. The display 265 may be an LCD, OLED or other display commonly used in portable electronic devices, or may be any of the displays described above with respect to the telecommunications device 30. As the I/O interface 270 and mass storage 275 may be implemented in the same way as described above with respect to the telecommunications device 30, further description of these components is omitted for the sake of brevity. Of course, one of ordinary skill in the art would recognize that the smart phone 40, or any other terminal device, may be an IOS device, such as an iPhone or iPad from Apple Corp., or may be an Android or Windows based device, such as a Samsung Nexus or a Nokia Lumia. Thus, the nature and operating system of the terminal device(s) described herein is merely exemplary and does not limit the scope of the present disclosure.

The sound receiver 240 of the smart phone 4 may be a general purpose microphone and associated circuitry already present in the terminal device without modification or customization, and may be used to receive the ultrasonic out-of-band communication from the telecommunications device 30 in addition to capture standard audio, such as voice. The terminal device may also be modified to include a dedicated ultrasound received, however. Also, though only reception is shown, two-way ultrasonic communication may also be used together with the present disclosure.

The network interface 245 may be used by the smart phone 40 to connect to such wireless networks as Wi-Fi, Wi-Max, Bluetooth, or cellular data networks such as EDGE, 3G, 4G and 4G LTE. The network interface 245 may also include hardware to connect to wired networks such as Ethernet.

Figure 3:
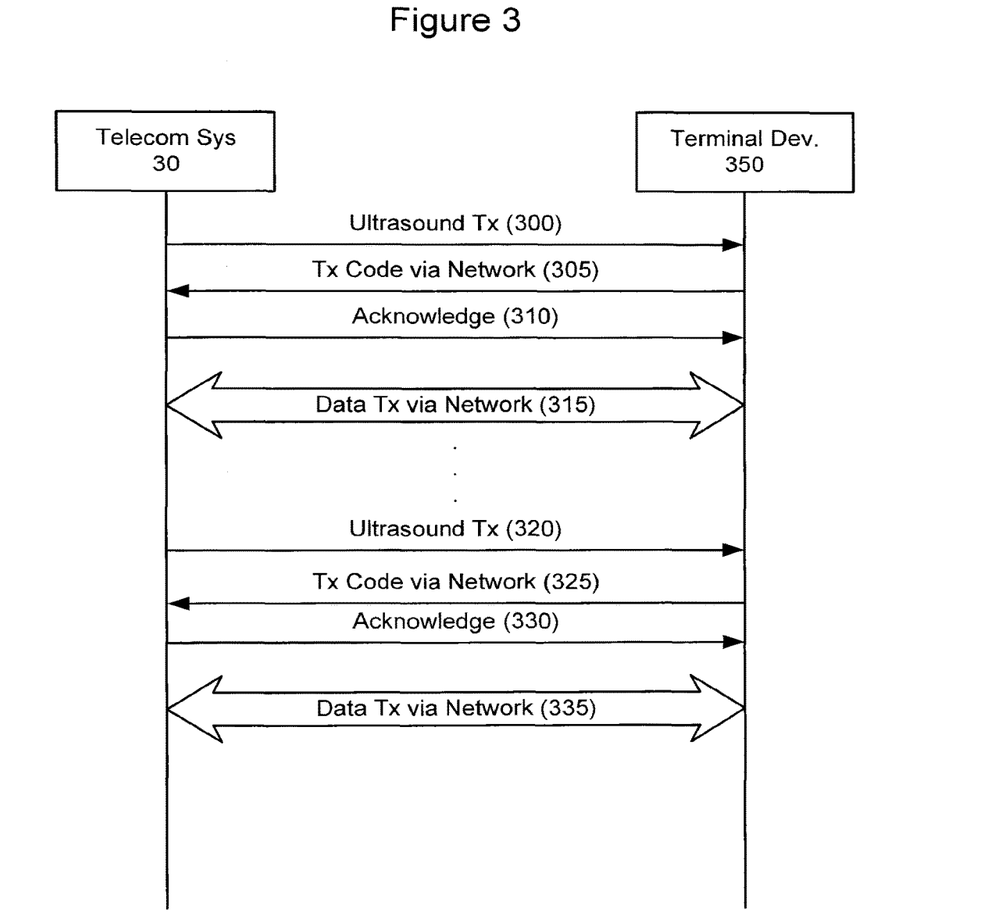
FIG. 3 illustrates an exemplary communication exchange between the telecommunication device and the terminal device in order to establish a communication session according to aspects of the present disclosure.
Figure 4:
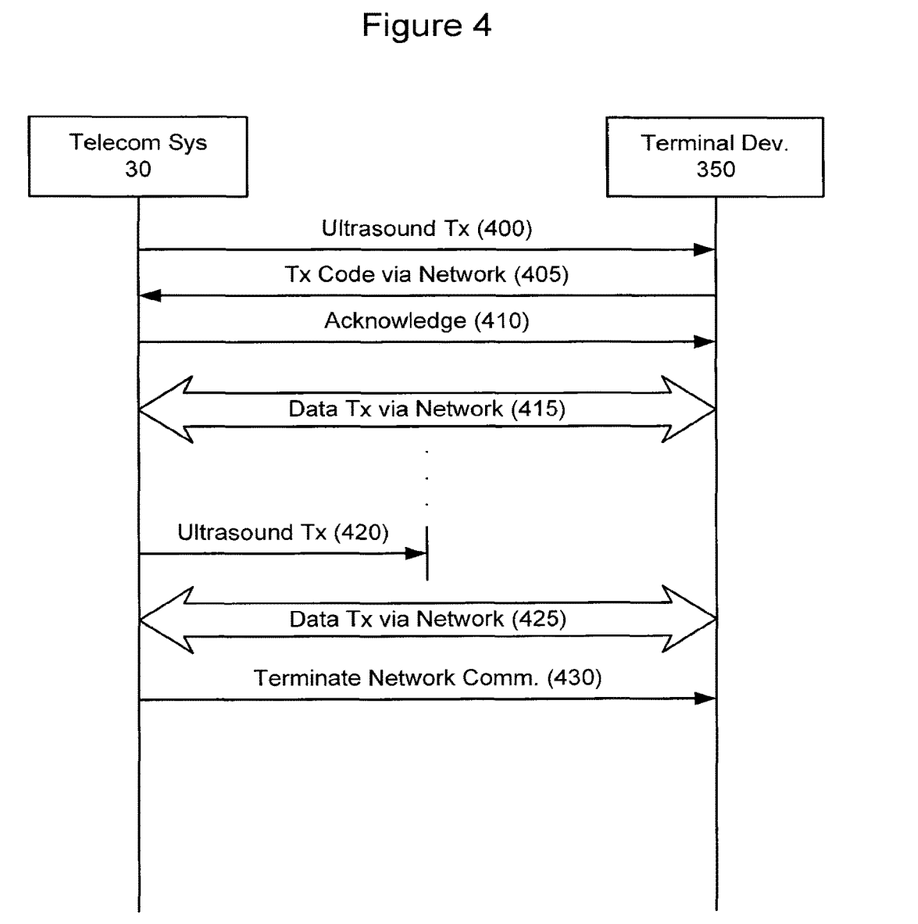
FIG. 4 illustrates an exemplary termination of a communication session between the telecommunication device and the terminal device according to aspects of the present disclosure.

FIGS. 3 and 4 illustrate the communication between the telecommunications device 30 and a terminal device. As described above, the terminal device can be any electronic device including smart phones, cell phones, laptop computers, desk top computers, tablet computers, or any other personal electronic device known in the art. Therefore, the following descriptions of FIGS. 3 and 4 are made with respect to a generic terminal device 350, which can be any of the above-listed devices.

FIG. 3 illustrates the communication between the telecommunications device 30 and the terminal device 30. At step 300, the telecommunications device 30 transmits its network address and a random number code using, for example, the ultrasound unit 230 described above. The terminal device 350 receives the ultrasonic transmission via, for example, the sound receiver 240 described above, and extracts the network address of the telecommunications device 30 and the random number code therefrom. Next, at step 305, the terminal device 350 transmits the random number code to the network address of the telecommunications device 30 via, for example, the network interface 245. In other words, the terminal device 350 receives the network address and random number code via the out-of-band ultrasound channel, but transmits the received random number code to the telecommunications device 30 through the in-band data network, which can be any of the networks described above.

The telecommunications device 30 receives the transmission from the terminal device 30 via, for example, the network interface 225 and compares the random number code received therein to the random number code that it transmitted via the ultrasound unit 230. If the two random number codes match, the telecommunications device 30 sends an acknowledgement and any information necessary to establish a communication session via the in-band data network to the terminal device 350 via the network interface 225. After the communication is established, the telecommunications device 30 and the terminal device 350 communicate data to each other via the in-band data network using network interfaces 225 and 245, respectively (step 315).

In certain cases, a terminal device 350 may initially be present in the room 10 and may therefore establish a communication session with the telecommunications device 30 as described above, but may then exit the room 10. In order to ensure that only terminal devices 350 that are actually present in the room 10 can take part in the teleconference (or video conference) the telecommunications device 30 periodically generates a new random number code and transmits the new random number code, together with its network address, via the ultrasound unit 230 (step 320). The terminal device 350 receives the ultrasonic out-of-band communication extracts the new random number code and transmits it to the telecommunications device 30 via the network interface 245, as described above (step 325). The telecommunications device 30 may acknowledge that the correct new random number code is received at step 330 and data communication between the telecommunications device 30 and the terminal device 350 continues at step 335. In this way, the telecommunications device 30 may periodically check to see whether the terminal device 350 is still in the room 10 in order to determine whether to continue in-band communication with the terminal device 350.

FIG. 4 illustrates the communication between the telecommunications device 30 and the terminal device 350 when the terminal device 350 does not receive an ultrasonic out-of-band communication. Steps 400 to 415 are similar to steps 300 to 315 described above with respect to FIG. 3.

However, at step 415 the telecommunications device 30 sends a new random number code via ultrasonic out-of-band communication. In this case, the terminal device 350 does not receive the ultrasonic communication because, for example, the terminal device 350 is no longer in room 10. In this case, the terminal device 350 attempts to continue data communication as in step 415 (step 425), but the telecommunications device 30 expects to receive the new random number code within a predetermined time period after ultrasonic transmission thereof. If the telecommunications device 30 does not receive the new random number code or receive a random number code that does not match the new random number code, the telecommunications device 30 terminates the communication session with the terminal device via the data network at step 430. In this way, the telecommunications device 30 can ensure that terminal devices 350 that leave the room 10 are removed from the teleconference.

The manner in which the telecommunications device 30 terminates the communication session with the terminal device 350 may vary without departing from the scope of the present disclosure. For example, the telecommunications server 30 may send a request to terminate the session or may terminate the session without warning to the terminal device 350. If the communication session between the telecommunications device 30 and the terminal device 350 is encrypted, the telecommunications device 30 may also change the encryption key without providing a corresponding decryption key to the terminal device 350.

Likewise the period for re-generating the random number code and transmitting the new random number code may be varied without affecting the scope of the present disclosure. For example, this period may be as small as a microsecond or as large as several seconds. The size of the random number code may also be varied, but the random number code should be large enough to deter a brute-force attack.

Figure 5:
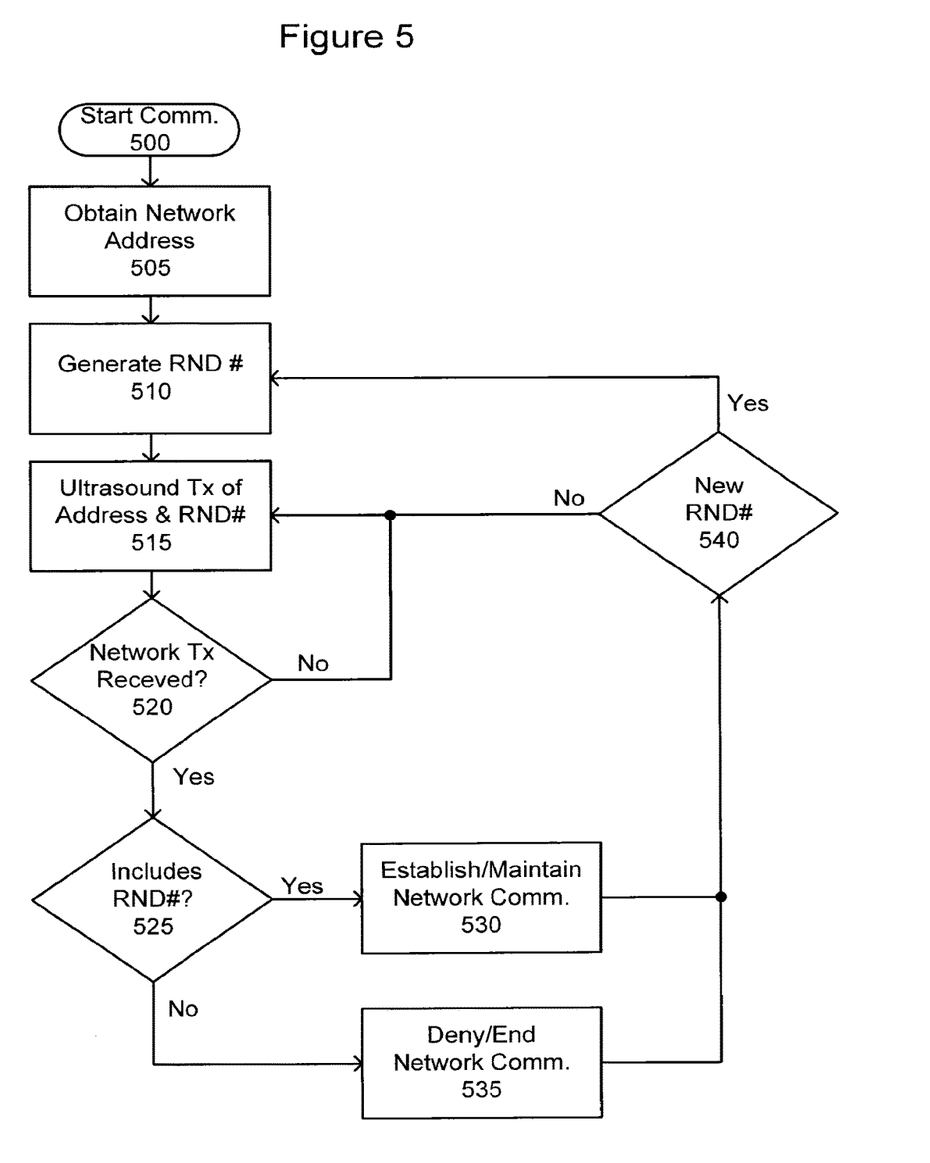
FIG. 5 illustrates an exemplary method performed by the telecommunications device according to aspects of the present disclosure.

Next, one exemplary process performed by the telecommunications device 30 is described with reference to FIG. 5. As one of ordinary skill in the art would recognize, this process may be encoded into a set of computer-readable instructions and may be stored in computer-readable media, such as the memory 205 or the mass storage unit 220. In FIG. 5, a teleconferencing or videoconferencing session is started by the telecommunications device 30 at step 500. At step 505, the telecommunications device 30 obtains its network address. This can be performed by, for example, querying a DHCP server when the network address is dynamically assigned or reading the address from memory 205 when the network address is statically assigned. At step 510 the telecommunications device 30 generates the random number code using any random number generating algorithm known in the art. At step 515, the telecommunications device 30 transmits the network address and the random number code using ultrasound via the ultrasound unit 230. Then at step 520, the telecommunications unit waits for a communication from a terminal device 350 via the data network. If no communication is received, the telecommunication device 30 repeats step 515.

Although steps 515 and 520 are illustrated in FIG. 5 as being performed in a loop, they need not be. For example, the step 515 of transmitting the random number code and network address via the ultrasound out-of-band channel may be performed independently of any other step illustrated in FIG. 5. Step 510 may also be performed in conjunction with step 515 in order to transmit a new random number code each time an ultrasound out-of-band transmission is made. Independent performance the ultrasound transmission in step 515 may be accomplished autonomously by the ultrasound unit 240 or under control of the CPU 200 using an interrupt scheme, for example. In this way the other steps illustrated in FIG. 5, or of other processes performed by the telecommunications device 30, may be executed in parallel with step 515, as one of ordinary skill would recognize.

If a response is received by the telecommunications device 30 via its network interface 225, the telecommunications device 30 checks to see whether the response includes a random number code at step 525. If a random number code is included, but the code does not match the code transmitted at step 515, or if no code is received, the telecommunications device 30 either does not establish a communication session with the terminal device 350 via the data network or terminates an existing communication session with the terminal device 350 at step 535. After denial or termination of the communication session, the telecommunications device 30 proceeds to step 540 in which it determines whether a new random number code should be generated. If a new random number code is to be generated the telecommunications device 30 returns to step 510 to generate the new random number code and to repeat the steps described above. Otherwise, the telecommunications device returns to step 515 to send another ultrasound communication via the ultrasound out-of-band channel as described above.

As one of ordinary skill in the art would recognize the telecommunications device 30 may determine whether a new random number code is to be generated in any number of ways without departing from the scope of the present disclosure. For example, new random number codes may be generated at predetermined intervals with the use of a timer or as part of a loop of instructions. Further, the time interval between generation of new random number codes need not be fixed and may be selected from a pool of predefined intervals or may be selected at random. Generation of new random number codes may also be determined based on the number of devices requesting to connect to the telecommunications device 30, a number responses received with previously sent random number codes, or a number of responses received with incorrect random number codes or missing random number codes. The above described methods of determining whether to generate a new random number code may also be combined as one of ordinary skill would recognize.

If at step 525 the response includes a random number code that matches the random number code transmitted at step 515, the telecommunications device either establishes a communication session with the terminal device 350 via the data network or continues an existing communication session with the terminal device at step 530. Then the telecommunications device proceeds to step 540 to determine whether a new random number code should be generated as described above.

Figure 6:
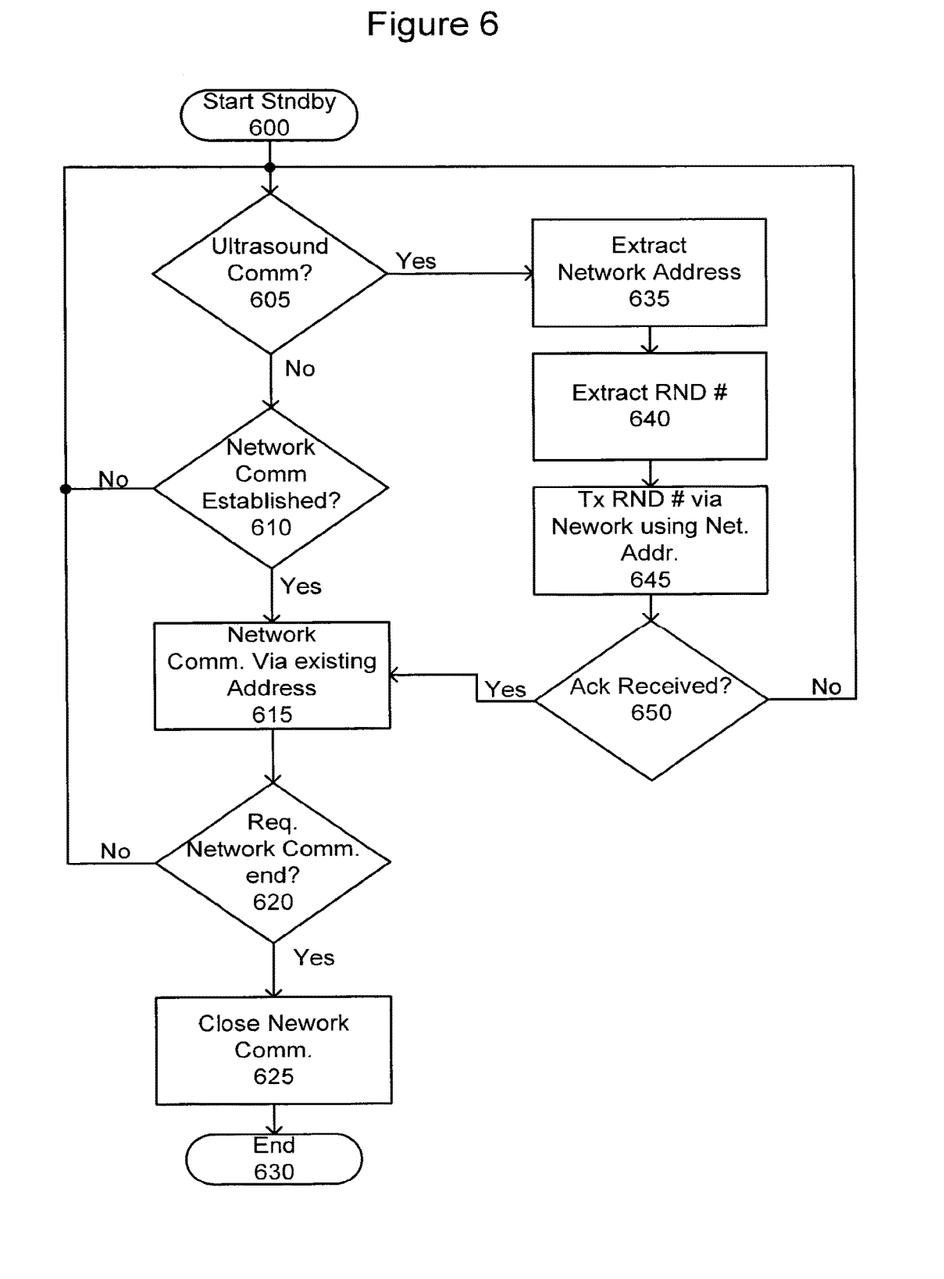
FIG. 6 illustrates an exemplary method performed by the terminal device according to aspects of the present disclosure.

FIG. 6 illustrates the process performed by the terminal device 350 in an example of the present disclosure. As one of ordinary skill in the art would recognize, this process may be encoded into a set of computer-readable instructions and may be stored in computer-readable media, such as the memory 260 or the mass storage unit 275. In FIG. 6, the terminal device 350 is in a mode in which it is on, but not necessarily performing any tasks, such as standby mode, at step 600. Of course, the terminal device may be performing other tasks as step 600 that are not necessarily related to communicating with the telecommunications device 30. At step 605, the terminal device determines whether an ultrasonic out-of-band communication is received. If not, the terminal device proceeds to step 610 where it determines whether a communication session with the telecommunications device already exists. If such a session already exists, the telecommunication device continues to perform data communication with the telecommunications device 30 at step 615. If no communication session exists, the terminal device 350 returns to step 605.

If at step 605 an ultrasound communication is received, the terminal device extracts a network address therefrom at step 635 and a random number code at step 640. Then at step 645 the terminal device 350 transmits the random number code to the network address via its network interface 245. At step 650, the terminal device determines whether it has received a reply via the network interface 245. If not, the terminal device returns to step 605. However, if a reply is received, the terminal device establishes a communication session with the telecommunication device 30 at step 615 and begins data communication.

At step 620, the terminal device 350 determines whether a request to terminate an existing communication session with the telecommunications device is received. If so, the terminal device 350 may close the communications session at step 625 and the process ends at step 630. If, however, no request to terminate the communication session is received at step 620, the terminal device reverts to step 605.

Figure 7:
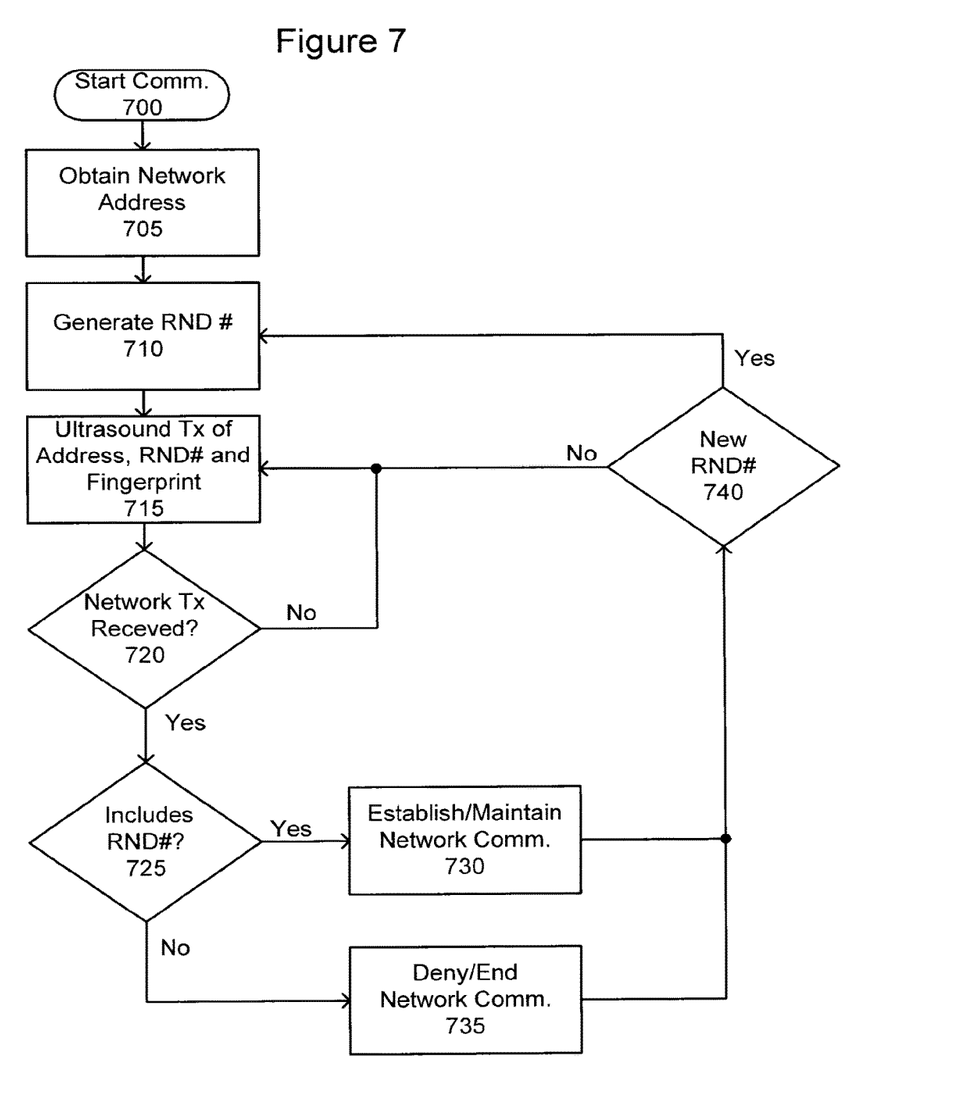
FIG. 7 illustrates another exemplary method performed by the telecommunications device according to aspects of the present disclosure.

FIG. 7 illustrates the process executed by the telecommunications device 30 when secure communications between the telecommunications device 30 and the terminal device 350 is to be established. Such secure communications may be performed using SSL/TLS, IPsec or with encryption protocols such as RSA, DES, for example. The exact method of securing a communication session between the telecommunications device 30 and the terminal device 350 in no way limits the present disclosure.

In FIG. 7, a videoconference or teleconference may be initiated at step 700. At step 705 the telecommunications device 30 obtains its network address by either reading it from memory or querying a DHCP server as described above. At step 705 the telecommunications device 30 also obtains a digital certificate fingerprint corresponding to a digital certificate of the telecommunications device 30. At step 710 the telecommunications device 30 generates the random number code, and at step 715 the telecommunications device transmits the network address, the random number code and the digital certificate fingerprint via the ultrasound out-of-band channel using the ultrasound unit 230. At step 720 the telecommunications unit determines whether it has received a communication over the data network (i.e., through the network interface 225.) If no communication is received from the data network, the telecommunications device 30 reverts to step 715 in order to retransmit the network address, random number code and digital certificate fingerprint using the ultrasound out-of-band channel. As noted above with respect to FIG. 5, transmission via the ultrasound out-of-band channel may occur independently of or in parallel to any of the other steps illustrated in FIG. 7.

If, however, the telecommunications device 30 determines that a network communication has been received at step 720, the telecommunications device proceeds to step 725 in which it determines whether the network communication includes the random number code. If the random number code transmitted at step 705 matches the one that is received at step 720, the telecommunications device proceeds to step 730 where it establishes a secure communication session with the terminal device 350 that sent the network communication received at step 720 and begins data communication with that device. Then, the telecommunications device proceeds to step 740 in which it determines whether a new random number code should be generated. If a new random number code is to be generated the telecommunications device 30 returns to step 710 to generate the new random number code and to repeat the steps described above. Otherwise, the telecommunications device returns to step 715 to send another ultrasound communication via the ultrasound out-of-band channel as described above. As noted above with respect to FIG. 5, the method of determining whether to generate a new random number code may be varied without departing from the scope of the present disclosure.

If, however, the random number code received at step 720 does not match the random number code transmitted at step 705, the telecommunications device 30 does not establish a secure communication session with the terminal device 350 or terminates a secure communication session with the terminal device 350 if one is under way at step 736. Then the telecommunications device 30 proceeds to step 740 to determine whether a new random number code is to be generated as described above.

Figure 8:
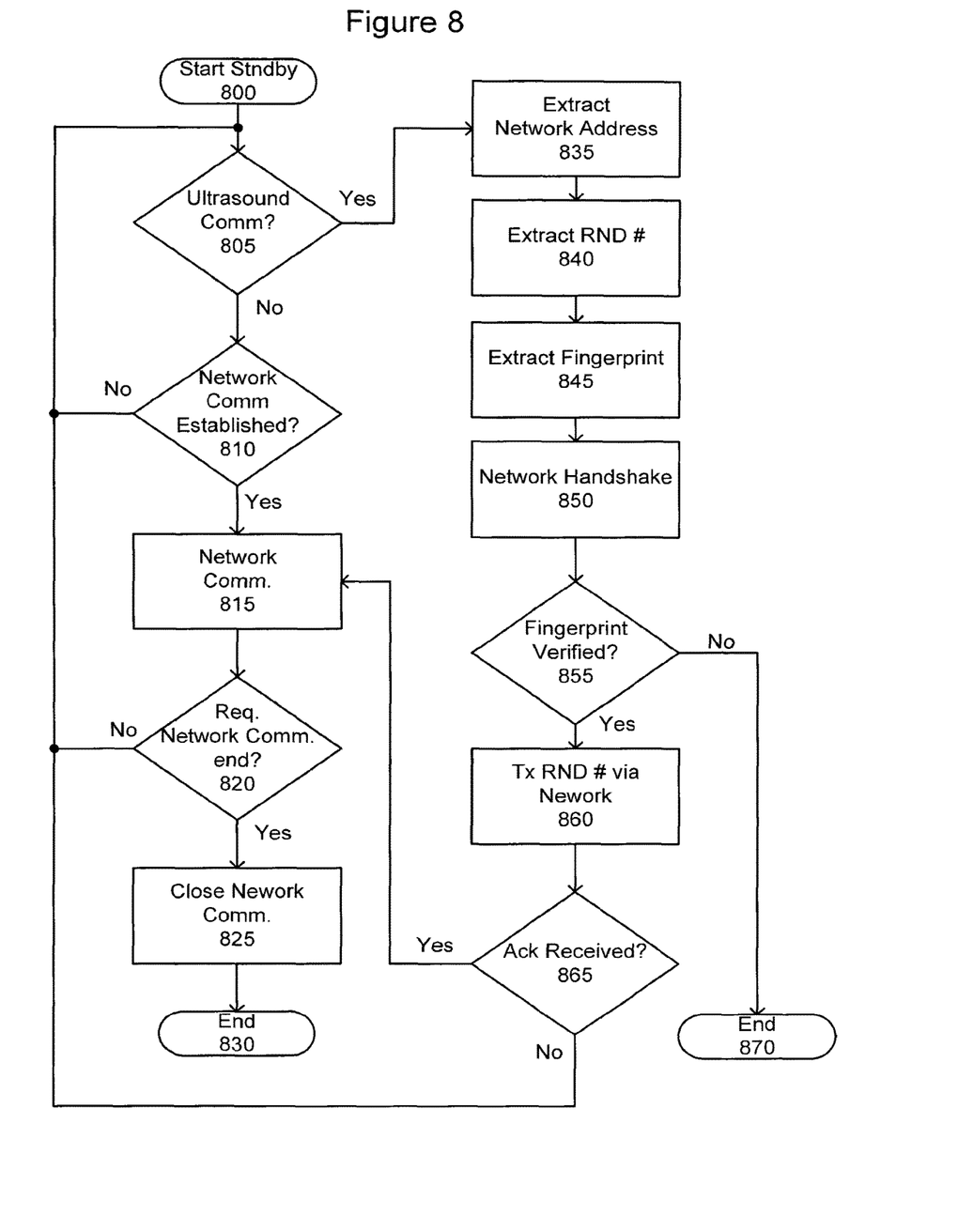
FIG. 8 illustrates another exemplary method performed by the terminal device according to aspects of the present disclosure.

FIG. 8 illustrates the process performed by a terminal device 350 when secure communication is to be established between it and the telecommunications device 30. The process begins at step 800. At step 805 the terminal device 350 determines whether it has received an ultrasound communication via the ultrasound out-of-band channel. This communication can be received through the sound receiver 240, for example. If at step 805, the terminal device 350 determines that an ultrasound communication was received, it proceeds to step 835 in which it extracts a network address from the ultrasound communication. In steps 840 and 845 the terminal device 350 extracts a random number code and a digital certificate fingerprint from the ultrasound communication, respectively. Then at step 850 the terminal device performs a network handshake with the telecommunications device 30. During the network handshake the terminal device 350 receives a digital certificate, from which it can derive the digital certificate finger print, from the telecommunications device 30 via the data network. At step 855, the terminal device 350 determines whether the digital certificate fingerprint received via the ultrasound communication and the digital certificate fingerprint derived from the digital certificate received via the data network match. If they do, the terminal device 350 proceeds to step 860 in which it transmits to the telecommunications device 30 via the data network the random number code. Then the terminal device 350 waits for an acknowledgement from the telecommunications device 30 at step 865. The acknowledgement may take any form known in the art from a simple acknowledgement message, i.e., an "ACK," to a more complex message including the connection parameters needed in order to establish a network communication session with a device corresponding to the network address such at the telecommunications device 30, for example.

If an acknowledgement is received, a secure communication session between the terminal device 350 and the telecommunications device 30 is established and communication between the two devices is performed at step 815. If, however, no acknowledgement is received, the terminal device 350 returns to step 805 to determine whether another ultrasound communication has been received.

After communication with the telecommunications device 30 is under way at step 815, the terminal device 350 checks to see whether a request to end the communication session is received at step 820. If no request to end the communication session is received, the terminal device reverts to step 805 to await another ultrasound communication. If a request to end the communication session is received at step 820, the terminal device ends the communication, or is simply cut off, at step 825 and the process ends at step 830.

Returning to step 805, if no ultrasound communication is received the terminal device 350 proceeds to step 810 in order to determine whether a communication session with the telecommunications device already exists. If not, the terminal device returns to step 805. If a communication session already exists, the terminal device 350 continues to step 815 to continue the session. Although not shown, the terminal device 350 may be interrupted when an ultrasound communication is received in order to revert to step 805 or may periodically return to step 805 in a polling architecture to determine whether ultrasound communications are received.

Figure 9:
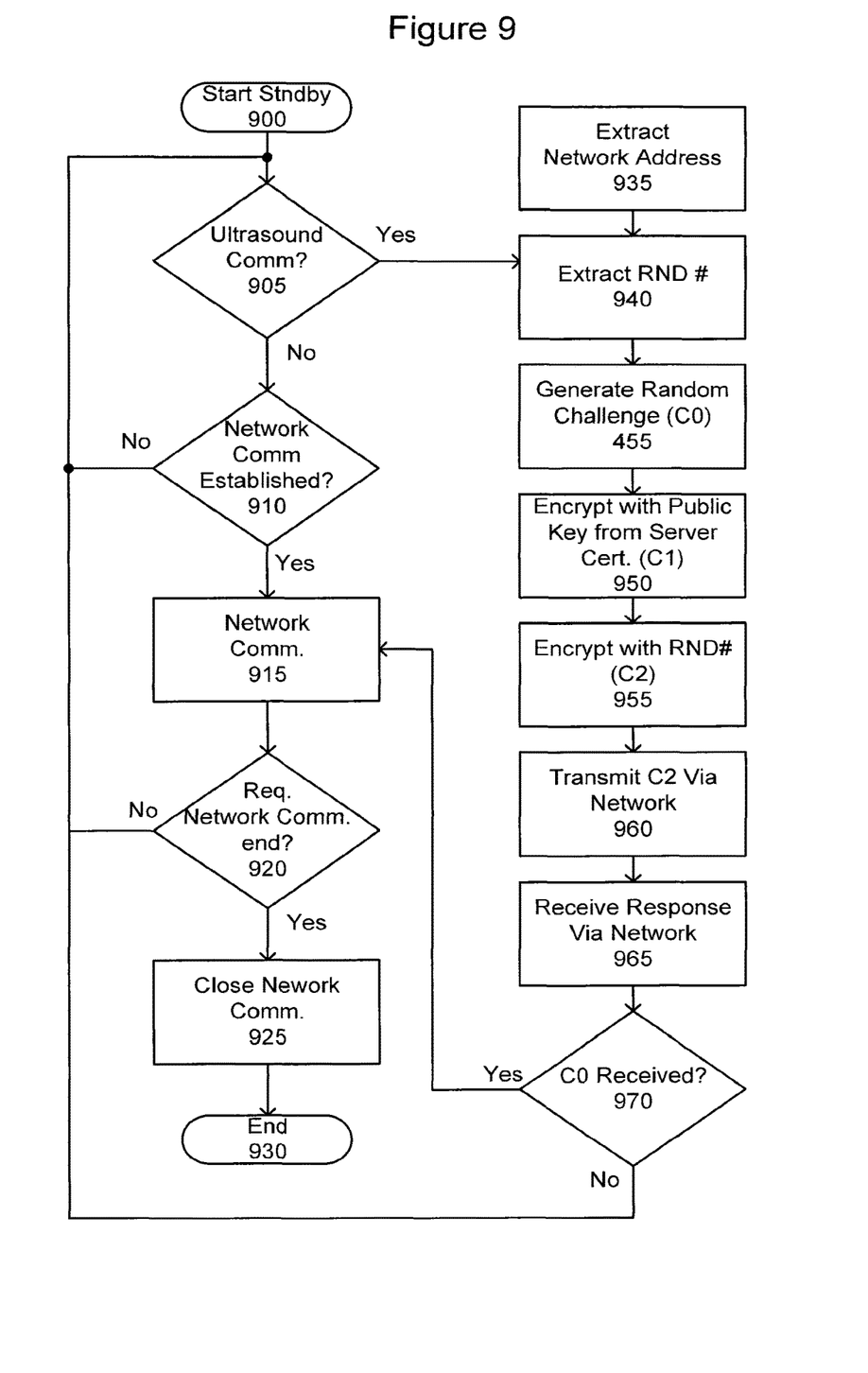
FIG. 9 illustrates a further exemplary method performed by the terminal device according to aspects of the present disclosure.

FIG. 9 illustrates another exemplary process performed by the terminal device 350 according to another aspect of the present disclosure. Specifically, when secure communication between the telecommunications device 30 and the terminal device 350 is to be established through, for example SSL/TLS and a server-side certificate, the certificate will not have been signed by a trusted third-party common to both the telecommunications device 30 and the terminal device. Therefore, another device may be used to trick the terminal device into thinking that the other device is the telecommunications device 30 and connecting to it. As such, the other device may be used to eavesdrop on the communication between the telecommunications device 30 and the terminal device 350 in what is known as a "man-in-the-middle" attack. However, the exemplary process illustrated in FIG. 9 creates a challenge-response scheme to safeguard against such attacks.

In FIG. 9, the process begins at step 900 and proceeds to step 905 where the terminal device 350 checks to see if an ultrasound communication has been received via the ultrasound out-of-band channel. If no ultrasound communication the terminal device 350 proceeds to step 910 where it determines whether a communication session with the telecommunications device 30 via the data network exists. If a communication session does not exist, the terminal device 350 returns to step 905. However, if a communication session with the telecommunications device 30 exists, then the terminal device continues to communication with the telecommunications device 30 at step 915.

At step 920, the terminal device 30 determines whether a request to end the communication session is received. If so, the terminal device closes the connection at step 925 and the process ends at step 930. If no request to end the communication is received the terminal device 350 returns to step 905 to check for an ultrasound communication as described above.

Returning to step 905, if the terminal device 350 receives an ultrasound communication, it proceeds to step 935 to extract a network address therefrom, and then to step 940 to extract the random number code. Then the terminal device 350 generates a random number challenge code C0 at step 945. This code C0 may be generated by any random number generation method known, as one of ordinary skill will recognize. The random number challenge C0 is then encrypted with the public key of a certificate corresponding to the telecommunications device 30 received, for example, as part of a SSL/TLS handshake. This generates an encrypted random number challenge C1 at step 950. After C1 is generated the terminal device performs a second encryption of C1 to generate a doubly encrypted random number challenge C2 using the random number code received via the ultrasound out-of-band channel at step 955. The doubly encrypted random number challenge C2 is then sent to the telecommunications device 30 at step 960 via the data network, and a response from the telecommunications device 30 is received at step 965. At step 970, the terminal device determines whether the response from the telecommunications device 30 includes the original, unencrypted random number challenge C0. If it does not, the terminal device proceeds to step 905 to check for another ultrasound communication via the out-of-band channel. If the original, unencrypted random number challenge C0 is received at step 965, the terminal device proceeds to step 915 to communicate with the telecommunications device 30 as described above. Because any device interposed on the data network between the telecommunications device 30 and the terminal device 350 would not receive the ultrasound out-of-band communication, it would not have the random number code with which to decrypt the doubly encrypted C2 in order to generate the response that the terminal device 350 expects, and the man-in-the-middle attack can be avoided.

Figure 10:
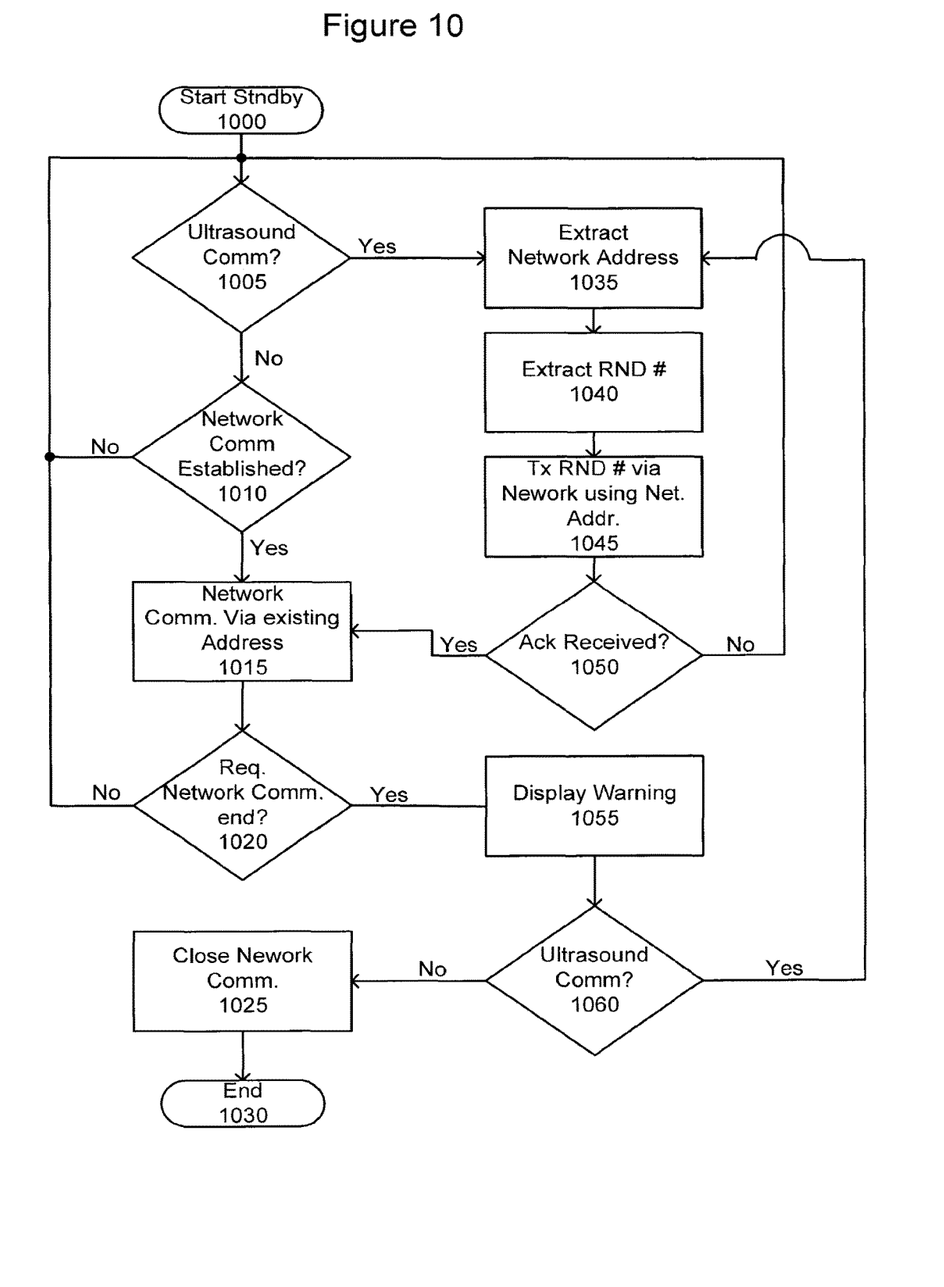
FIG. 10 illustrates an exemplary method of displaying an alert performed by the terminal device according to aspects of the present disclosure.

Next, FIG. 10 illustrates the operation of the terminal device 350 when an alert message is to be displayed on the display of the terminal device 350 before a communication session with the telecommunications device 30 is terminated or if such a communication session is denied. This situation can occur if the terminal device 30 is taken out of the room 10 or if the sound receiver 240 is obstructed and cannot receive the ultrasound communication sent through the ultrasound out-of-band channel. Displaying an alert message allows a user of the terminal device 350 to take action to maintain and/or establish the communication session with the telecommunications device 30, such as returning to the room 10 or removing the obstruction that prevents the sound receiver 240 from receiving the ultrasound out-of-band communications.

In FIG. 10, the process begins at step 1000. At step 1005 the terminal device 350 determines whether an ultrasound communication is received, and if so proceeds to step 1035. In steps 1035 and 1040 the terminal device 350 extracts the network address and random number code, respectively. Then at step 1045 the terminal device transmits the random number code to the network address received in the ultrasound communication. At step 1050 the terminal device awaits an acknowledgement. If no acknowledgement is received, the terminal device reverts to step 1005. However, if an acknowledgement is received, the terminal device 350 proceeds to step 1015 in order to establish a communication session via the network with the telecommunications device 30 and to begin communicating therewith.

At step 1020, the terminal device determines whether a request to terminate the communication session is received. If so, the terminal device proceeds to step 1055 in order to display an alert or a warning that the communication session with the telecommunications device 30 will be terminated. At step 1060, the terminal device again listens for an ultrasound communication, but if no ultrasound communication is received, the communication session is closed at step 1025 and the process ends at step 1030.

If an ultrasound communication is received at step 1060, the terminal device 350 reverts to step 1035 to extract the network address and random number code and to execute all of the steps described above in order to establish and/or maintain a communication session with the telecommunications device 30.

Returning to step 1005, if an ultrasound communication is not received the terminal device 350 proceeds to step 1010 to determine whether a communication session with the telecommunications device 30 is already established. If not, the terminal device returns to step 1005. If a communication session is already established with the telecommunications device 30, the terminal device continues to communicate with the telecommunications device 30 as described above until the communication session is terminated as described above.

As one of ordinary skill would recognize the process illustrated in FIG. 10 may also be used when establishing a secure communication session over the network between the telecommunications device 30 and the terminal device 350 as described with reference to FIGS. 7 and 8. Further, the warning or alert displayed to the user may take any form including graphics, text, sound, vibration or a combination thereof. Other parties to the teleconference or videoconference may also be alerted by the telecommunications device 30 that the terminal device 350 is being disconnected. As such the process of alerting the terminal device to an imminent termination of a communication session with the telecommunications device 30 described herein is merely exemplary and in no way limits the present disclosure.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Obviously, numerous modifications and variations of the present invention are possible in light of the above teachings. It is therefore to be understood that within the scope of the appended claims, the invention may be practiced otherwise than as specifically described herein.

The invention claimed is:

1. A method comprising:
identifying a network address;
generating a code;
broadcasting an ultrasound communication including data indicative of the network address, the code, and a first digital certificate fingerprint;
providing a digital certificate via a data network to a terminal device in response to the terminal device performing a network handshake;
when a second digital certificate fingerprint derived from the digital certificate matches the first digital certificate fingerprint, receiving a response from the ultrasound communication from the terminal device at a network interface;
extracting the code from the response; and
establishing a communication session with the terminal device using the network interface.

2. The method of claim 1, further comprising:
generating an acknowledgement message upon receipt of the response; and
sending the acknowledgement message to the terminal device.

3. The method of claim 1, wherein broadcasting the ultrasound communication comprises:
emitting the ultrasound communication through one or more speakers.

4. The method of claim 1, wherein the communication session includes a video conference.

5. The method of claim 1, further comprising:
waiting a predetermined time period for the response; and
repeating the broadcasting of the ultrasound communication in response to the predetermined time period elapsing.

6. The method of claim 1, wherein the code is generated from a random number generating algorithm.

7. The method of claim 1, further comprising:
periodically generating a new code; and
broadcasting an ultrasound communication including data indicative of the network address, the new code, and the first digital certificate fingerprint.

8. An apparatus including:
a processor; and
a memory comprising one or more instructions executable by the processor to perform:
accessing a network address;
accessing a random code;
transmitting an ultrasound communication including data indicative of the network address, the random code, and a first digital certificate fingerprint using a first interface;
providing a digital certificate via a data network to a terminal device in response to the terminal device performing a network handshake;
when a second digital certificate fingerprint derived from the digital certificate matches the first digital certificate fingerprint, receiving a response from the terminal device using a second interface;
extracting the random code from the response; and
establishing a communication session with the terminal device.

9. The apparatus of claim 8, the processor further configured to execute instructions for:
generating an acknowledgement message upon receipt of the response; and
sending the acknowledgement message to the terminal device.

10. The apparatus of claim 8, the processor further configured to execute instructions for:
emitting the ultrasound communication through one or more speakers.

11. The apparatus of claim 8, wherein the communication session includes a video conference.

12. The apparatus of claim 8, the processor further configured to execute instructions for:
waiting a predetermined time period for the response; and
repeating the broadcasting of the ultrasound communication in response to the predetermined time period elapsing.

13. The apparatus of claim 8, wherein the random code is generated from a random number generating algorithm.

14. A non-transitory computer readable medium including instructions that when executed are configured to cause a processor to:
access a random code from memory;
transmit an ultrasound communication including data indicative of the random code and a first digital certificate fingerprint;
provide a digital certificate via a data network to a terminal device in response to the terminal device performing a network handshake;

when a second digital certificate fingerprint derived from the digital certificate matches the first digital certificate fingerprint, receive a response from a terminal device at a network interface;

extract a received code from the response; and determine whether the received code matches the random code.

15. The non-transitory computer readable medium of claim 14, the instructions when executed are configured to cause the processor to:

establish a communication session with the terminal device using the network interface in response to the received code matching the random code.

16. The non-transitory computer readable medium of claim 15, wherein the communication session includes a video conference.

17. The non-transitory computer readable medium of claim 14, the instructions when executed are configured to cause the processor to:

emit the ultrasound communication through one or more speakers.

18. The non-transitory computer readable medium of claim 14, wherein the instructions when executed are configured to cause the processor to:

generate an acknowledgement message upon receipt of the response; and send the acknowledgement message to the terminal device.

19. The non-transitory computer readable medium of claim 14, wherein the instructions when executed are configured to cause the processor to:

wait a predetermined time period for the response; and repeat the ultrasound communication in response to the predetermined time period elapsing.

20. The non-transitory computer readable medium of claim 14, wherein the random code is generated from a random number generating algorithm.

* * * * *